Patented Nov. 16, 1926.

1,607,064

UNITED STATES PATENT OFFICE.

ELMER ELLSWORTH ELDREDGE, OF OCONOMOWOC, WISCONSIN.

METHOD OF PASTEURIZING CHEESE.

No Drawing. Application filed February 16, 1925. Serial No. 9,708.

My invention relates to an improved method for Pasteurizing cheese, and it consists in the steps hereinafter specified.

In Pasteurizing cheese, as heretofore carried out, the cheese mass is trimmed and ground or sliced into small particles, after which it is placed in a steam jacketed mixing kettle or container, mixed with a small amount of sodium phosphate to which a small quantity of water has been added, after which the mixture is heated to about 140° Fahrenheit. This results in a melting of the cheese and the melted mass is poured into containers and allowed to cool.

Pasteurization is accomplished, but the cheese mass on cooling does not regain a firm solid body which is essential in producing a good slicing cheese.

The main object of my invention is to provide a method by means of which cheese may be effectually sterilized or Pasteurized and which will produce a cheese having a firm body, thereby facilitating the slicing of the cheese.

I have found that if instead of using a sodium salt, such as sodium phosphate, ammonium salts, such as ammonium tartrate, ammonium chloride, or ammonium phosphate are used, the result is a superior cheese of firm body and good slicing qualities.

In carrying out my invention the cheese is first trimmed and ground into small particles. It is then placed in a steam jacketed mixing kettle to which a small quantity of water is added and preferably about three-fourths of one per cent of ammonium tartrate and one-fourth of one per cent of ammonium chloride. The mass is then heated to about 140° Fahrenheit and while in a melted condition is poured into containers and allowed to cool. The resulting mass has a comparatively firm body and the produce is a good slicing cheese.

The action of the ammonium salts is to put the casein of the cheese in a plastic adhesive mass which tends to make a body that will not crumble, as distinguished from the case when sodium phosphate is used.

Instead of ammonium tartrate and ammonium chloride, I may use about one and one-fourth per cent of ammonium phosphate with equally good results.

I claim:

1. The herein described method of Pasteurizing cheese which consists in first grinding the cheese, mixing therewith a small quantity of water together with substantially three-fourths of one per cent of ammonium tartrate and one-fourth of one per cent of ammonium chloride, heating the mixture to substantially 140° Fahrenheit and allowing the mixture to cool.

2. The herein described method of Pasteurizing cheese which consists in first grinding the cheese, mixing therewith a small quantity of water together with ammonium tartrate and ammonium chloride, heating the mixture until the cheese is melted and allowing the mixture to cool.

ELMER ELLSWORTH ELDREDGE.